Sept. 16, 1941.    S. B. GRISCOM    2,255,923
STARTING MEANS FOR SYNCHRONOUS MOTORS
Filed Aug. 12, 1938

INVENTOR
Samuel B. Griscom.
BY
ATTORNEY

Patented Sept. 16, 1941

2,255,923

UNITED STATES PATENT OFFICE 2,255,923

STARTING MEANS FOR SYNCHRONOUS MOTORS

Samuel B. Griscom, Wilkinsburg, Pa., assignor to Westinghouse Electric & Manufacturing Company, East Pittsburgh, Pa., a corporation of Pennsylvania Application August 12, 1938, Serial No. 224,514

11 Claims. (Cl. 172—289)

The present invention relates to the starting of synchronous motors and, more particularly, to a method and means for improving the pull-in characteristics of synchronous motors so that they will pull into synchronism under more adverse conditions of loading and inertia than has heretofore been possible.

The usual practice in starting a synchronous motor is to short-circuit the field winding through a resistor of several times the direct current resistance of the field, and to energize the stator winding either with reduced voltage or with full line voltage, depending on the size of the motor and other conditions. The damper winding then acts as a squirrel-cage secondary winding and the motor will start as an induction motor. When the motor has partly come up to speed, full voltage is applied to the stator winding if reduced voltage starting has been used. The machine will accelerate as an induction motor to a speed from 95% to 98% of synchronous speed, but if loaded will never quite reach synchronous speed. When the motor has reached approximately its maximum speed as an induction motor, direct current field excitation is applied, and in most cases it will pull into step and run at synchronous speed.

If the motor is heavily loaded, however, and the load is direct connected so that it cannot be relieved during the pull-in period, and if the inertia is high, the motor cannot be made to pull into synchronism by the method outlined above in many cases. The reason for this is that, when the field excitation is applied, a pulsating torque, produced by the interaction of the direct current field and the rotating field of the armature winding, is superimposed on the induction motor torque. This torque pulsates at a rate equal to the slip frequency of the motor, and if the field excitation is applied at random, there is an equal chance of obtaining initially either a positive half cycle or a negative half cycle of torque. If a negative half cycle occurs first, it may be impossible for the motor to pull into synchronism against a heavy load, since the resulting deceleration will slow the machine down enough so that the succeeding positive half cycle of torque will not accelerate it to synchronous speed. This effect therefore has greatly limited the application of synchronous motors to direct connected, high torque loads and especially where the inertia of the load and rotating parts of the machine is high, and has made it necessary to use other types of motors in these cases.

The object of the present invention, therefore, is to improve the pull-in characteristics of synchronous motors so that they will pull into step under the most adverse conditions of loading and inertia.

More specifically, the object is to provide an arrangement for starting a synchronous motor in which the direction of field excitation is controlled during the pull-in period in such a manner that the pulsating torque always adds to the induction motor torque and the decelerating effect described above is avoided. This may be done either by reversing the direction of field excitation in time with the pulsations of the torque, or by removing the field excitation during the times when a negative torque would be produced and applying it only during the times when a positive torque would be produced.

Other objects and advantages of the invention will be apparent from the following detailed description of a preferred embodiment taken in connection with the accompanying drawing in which.

A more complete understanding of the invention will be facilitated by a brief consideration of the conditions existing in a synchronous motor during the pull-in period.

Figure 1:
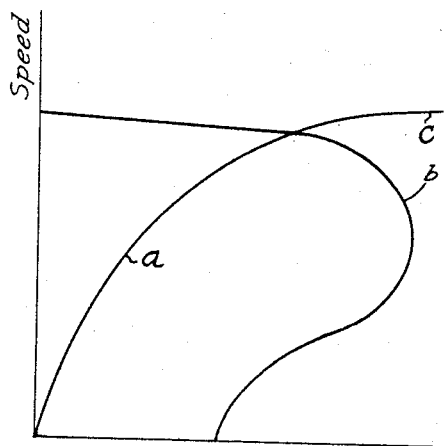
Figures 1 and 2 are explanatory curves.
Figure 2:
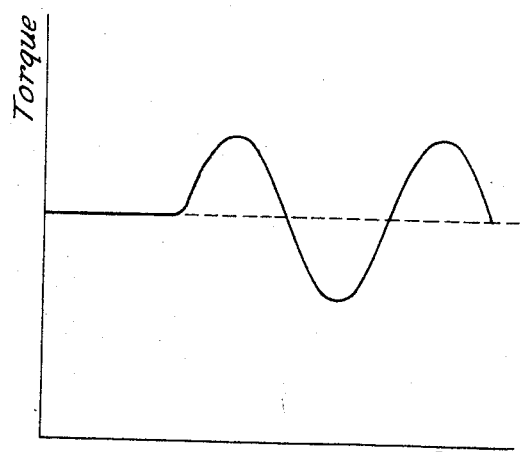

Curve $a$ in Fig. 1 shows an assumed speed-torque characteristic for a typical direct connected load such as a fan, and curve $b$ of this figure shows the induction motor torque of the motor. The corresponding synchronous torque is indicated by the point $c$. It will be seen that the induction motor torque, which is used to start the motor, decreases rapidly as synchronous speed is approached, and drops to zero at synchronous speed. Superimposed on this induction motor torque during the starting period is a fluctuating torque which is caused by the variable reluctance of the magnetic path provided by the usual salient pole field structure as it slips by the field of the stator winding. When the direct current field excitation is applied while the motor is running as an induction motor below synchronous speed, the amplitude of this fluctuating torque is greatly increased by a pulsating torque which is superimposed on the induction motor torque. This pulsating torque is produced by the interaction of the direct current field and the rotating stator field which is rotating at synchronous speed, and, for convenience, it will be referred to as synchronous torque. This torque is shown by the curve of Fig. 2, in which the horizontal line represents the load torque. Since this pulsating torque is produced by the slipping of the field structure past the armature field, its frequency will be equal to the rate of this slipping or to the slip frequency of the motor.

If the field excitation is applied at random with respect to the relative position of the field and armature poles, there is an equal chance of either a positive or negative half cycle of synchronous torque occurring first. Where the load is light and the inertia is low, it does not matter much which occurs first, because if a negative half cycle should occur initially, it will somewhat decelerate the machine but the succeeding positive half cycle will be large enough to accelerate the motor to synchronism and hold it there.

Where the motor is heavily loaded, however, and the inertia is high, the situation is quite different. If the initial half cycle of synchronous torque is negative, it will decelerate the motor. The succeeding positive half cycle of torque will tend to accelerate it, but as the speed increases the load also increases, as shown in Fig. 1, and the induction motor torque decreases. Also, if the inertia is high, it tends to prevent a rapid change in speed. The result of these effects is that the motor will not quite reach synchronism and the following negative half cycle of synchronous torque will further decelerate it so that it will never quite reach synchronous speed, but will continue to slip, causing excessive heating of the damper winding and fluctuation of the supply voltage. In some cases the motor will slow down, and in extreme cases, depending upon the combination of load characteristics, speed-torque curve, and losses due to field excitation, it may even stall.

The difficulty in pulling heavily loaded motors into step will be more clearly seen from the following table, which is based on a motor and connected load with a combined inertia of 3 kilowatt-seconds per kilowatt of rating.

| Per cent speed as an induction motor | Time available to pull in, seconds | Average acceleration required, elec. deg. per second | Average synchronizing torque required, per cent of full load |
| --- | --- | --- | --- |
| 95   | .167  | 6500 | 180 |
| 96   | .208  | 4150 | 115 |
| 97   | .277  | 2340 | 65  |
| 98   | .417  | 1030 | 29  |
| 99   | .833  | 260  | 7   |
| 99.5 | 1.67  | 65   | 1.8 |

The higher speeds shown in this table correspond, of course, to low loads and it will be seen that this greatly facilitates pulling into step, since the necessary synchronizing torque varies with the square of the slip. Low inertia is also helpful, but not to the same extent, since the necessary synchronizing torque varies with the first power of inertia.

On border-line cases between the extremes of high and low loads and inertia, the so-called "angle switching" method of starting can sometimes be used. This method consists in applying the field excitation at the instant when a predetermined phase angle exists between the position of the field poles and the rotating stator field, so that a positive half cycle of synchronous torque is always obtained first. This method can be successfully used in some cases, but in many cases it is unsatisfactory, since its successful operation depends on pulling the motor into step during the initial half cycle of synchronous torque, and if the conditions of loading are such that this does not occur, the motor will not reach synchronism but will continue to slip as explained above.

The present invention consists broadly in controlling the direction of field excitation during the pull-in period in such a manner that the negative half cycles of synchronous torque are entirely eliminated, and therefore, if the initial positive half cycle does not accelerate the motor all the way to synchronous speed, the gain in speed is not lost and the next succeeding half cycle will still further accelerate it, and so on until synchronism is reached. This may be accomplished either by reversing the direction of the field excitation in time with the pulsations of the synchronous torque, or by removing the field excitation during the time that the negative half cycles would occur and applying it only during the times when a positive half cycle is produced.

Figure 3:
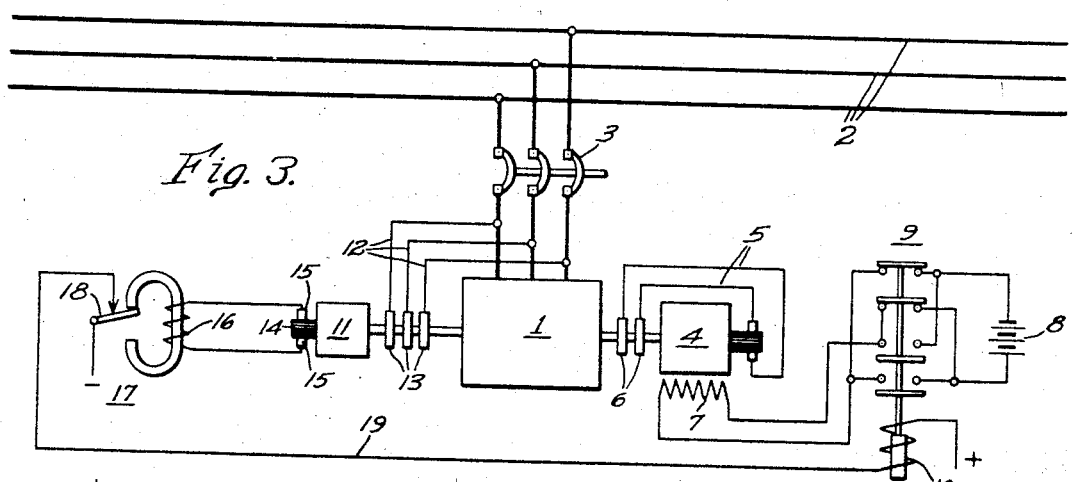
Fig. 3 is a diagram showing a preferred embodiment of the invention.

This result may be accomplished in various different ways, but a preferred embodiment of the invention is shown in Fig. 3. In this figure, a synchronous motor is shown at 1, connected to a three-phase alternating current supply line 2 through a suitable line switch or circuit breaker 3. Field excitation for the motor 1 is supplied by a suitable exciter 4 which is direct connected to the motor 1 and supplies direct current to its field through conductors 5 and slip rings 6. The exciter 4 is provided with a field winding 7 which is supplied with direct current from any suitable source, indicated diagrammatically by a battery 8. The field winding 7 is connected to its supply through a reversing switch 9, which may be of any suitable type, and is actuated by an operating coil 10.

A small auxiliary generator 11 is mounted on the shaft of the motor 1 at the opposite side from the exciter 4, and is energized from the alternating current supply through conductors 12 and slip rings 13. At its opposite end this auxiliary generator has a commutator 14 and brushes 15 which are connected to the winding 16 of a polarized relay 17. The generator 11 preferably has a rotor carrying a polyphase winding energized from the slip rings 13, and the bars of the commutator 14 are connected to suitable taps in this winding in a similar manner to the conventional rotary converter. A laminated stator member is preferably used but no winding is required on the stator since it is only necessary to provide a low reluctance path for the flux produced by the rotor. It will be apparent that when the motor 1 is running at synchronous speed, the auxiliary generator 11 will deliver a unidirectional voltage at the brushes 15. When the motor 1 is running at less than synchronous speed, however, the voltage delivered at the brushes 15 will be an alternating voltage having a frequency equal to the difference between the speed of the rotating field created by the polyphase winding of the generator 11 and the actual speed of rotation of the rotor due to its connection to the shaft of the motor 1, or in other words, its frequency will be equal to the slip frequency of the motor.

The polarized relay 17 will close its contacts 18 when current flows in one direction through the coil 16 and will open the contacts when current flows in the opposite direction. Closing of the contacts 18 completes a circuit through a conductor 19 to the operating coil 10 of the reversing switch 9. It will be apparent therefore that during the pull-in period when the motor 1 is running at less than synchronous speed, an alternating current of frequency equal to the slip frequency of the motor will flow through the coil 16 and cause the contacts 18 of the relay 17 to open and close at a rate equal to this frequency. This causes corresponding operation of the reversing switch 9, which results in a cyclic reversal of the exciter field 7 in time with the slip frequency of the motor which, of course, causes corresponding reversal of the main motor field.

Figure 4:
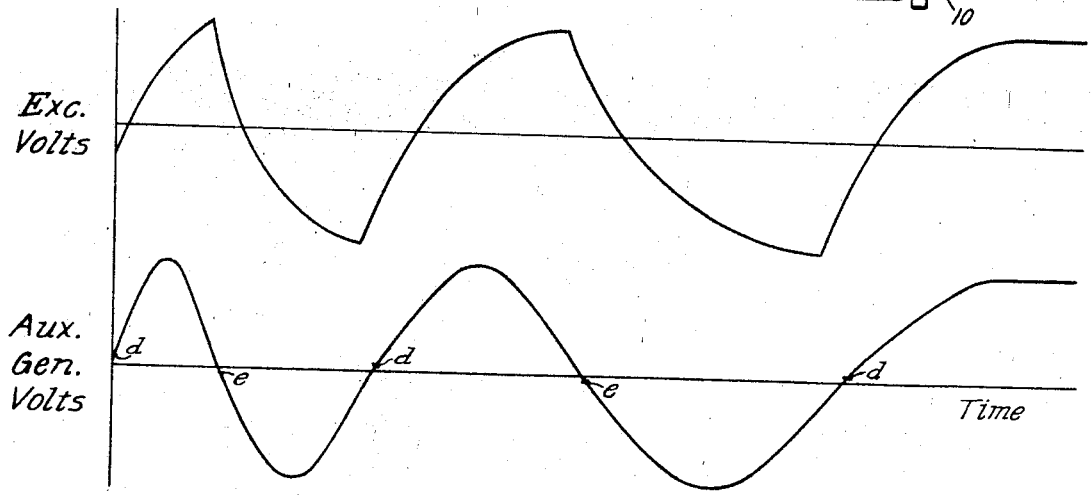
Fig. 4 is a diagram showing certain characteristics of the starting scheme shown in Fig. 3.

This effect is illustrated in Fig. 4 in which the lower curve shows the voltage of the auxiliary generator 11 while the upper curve shows the voltage of the exciter 4. It will be seen that the frequency of the auxiliary generator voltage is decreasing, showing that the speed of the motor is approaching synchronism, with a corresponding decrease in slip. The straight portion of the curve at the extreme right indicates that synchronism has been reached and the generator 11 is supplying a unidirectional voltage. The points $d$ and $e$ on this curve indicate the points at which the contacts 18 of the relay 17 open and close, respectively, and the upper curve shows the corresponding reversal in the exciter voltage, which causes reversal of the motor field.

The operation of this starting system should now be apparent. To start the motor, the line switch 3 is closed, energizing the armature winding of the motor 1 and also energizing the auxiliary generator 11. The motor then accelerates as an induction motor until it reaches a constant speed of from 95 to 98% of synchronous speed, depending on the load. At this point the exciter field is energized to apply direct current excitation to the motor and the relay 17 will operate to cause the direction of this field excitation to reverse in time with the slip frequency of the motor in the manner described above. Thus the direction of field excitation reverses in time with the pulsations of the synchronous torque, so that the negative half cycles are eliminated and the direction of this pulsating torque is alway such as to add to the induction motor torque. When the motor reaches synchronous speed, the slip frequency becomes zero and the auxiliary generator 11 will supply a unidirectional voltage so that the reversing switch 9 will remain closed in one position or the other, and the field excitation will be unidirectional, as shown at the extreme right of Fig. 4.

It will be apparent that many modifications of this arrangement are possible. Thus, instead of using the reversing switch 9, a switch or contactor may be used to open the circuit of the exciter field during the times when a negative half cycle of synchronous torque would occur, and to close it during the times when the synchronous torque would be positive. This switch would, of course, be controlled by the relay 17 in the manner described above. In many cases, the auxiliary generator 11 may be replaced by a simple mechanical rectifier consisting merely of a sufficient number of commutator bars to which one phase of the three-phase conductors 12 is connected. When such a rectifier is driven at synchronous speed, direct current is obtained from the brushes bearing on the commutator, while if the speed is less than synchronous speed, the current flowing through the brushes will be an alternating current with a frequency corresponding to the difference between the actual speed of rotation and synchronous speed. Thus, a rectifier of this type can in many cases be used in place of the generator 11. Whichever form of auxiliary device is used, however, to supply alternating current to the relay 17, it can be made quite small and inexpensive, since only a small amount of energy is required to operate the relay.

It will be seen, therefore, that a relatively simple, but very effective, arrangement has been provided for improving the pull-in characteristics of synchronous motors, thus making it possible for such motors to pull into step under more adverse conditions of loading and inertia than has heretofore been possible and greatly extending the range of application of synchronous motors.

Although a particular embodiment of the invention has been illustrated and described, it is to be understood that it is not limited to the specific arrangement shown, but that it is capable of other embodiments and modifications without departing from the spirit of the invention. In its broadest aspects, therefore, it includes all equivalent embodiments and modifications which come within the scope of the appended claims.

I claim as my invention:

1. In combination with a synchronous motor which is adapted to be started as an induction motor, an exciter for supplying direct current field excitation to the motor, means for generating an alternating current of frequency equal to the slip frequency of the motor while it is running as an induction motor, means for reversing the direction of the current supplied by the exciter, and a polarized relay energized by said alternating current and connected to effect operation of said reversing means.

2. In combination with a synchronous motor which is adapted to be started as an induction motor, an exciter for supplying direct current field excitation to the motor, means for generating an alternating current of frequency equal to the slip frequency of the motor while it is running as an induction motor, a set of contacts for causing the direct current supplied by the exciter to flow in one direction, a second set of contacts for causing said direct current to flow in the opposite direction, and a polarized relay energized by said alternating current for causing said sets of contacts to be alternately closed.

3. In combination with a synchronous motor which is adapted to be started as an induction motor, an exciter for supplying direct current field excitation to the motor, means for generating an alternating current of frequency equal to the slip frequency of the motor while it is running as an induction motor, a set of contacts for interrupting the flow of direct current from the exciter, and a polarized relay energized by said alternating current for causing said contacts to open and close in time with the alternations of said current.

4. In combination with a synchronous motor having a polyphase stator winding adapted to be connected to an alternating current supply line, and a direct current field winding, means for starting the motor as an induction motor, means for supplying direct current excitation to the field winding, means for controlling the direction of said direct current excitation, an auxiliary device connected to the motor for producing an alternating current of frequency equal to the slip frequency of the motor while it is running below synchronous speed, and means responsive to the instantaneous direction of said alternating current for effecting operation of said controlling means so that the direct current excitation is always in the proper direction to assist the motor to pull into synchronism.

5. In combination with a synchronous motor having a polyphase stator winding adapted to be connected to an alternating current supply line, and a direct current field winding, means for starting the motor as an induction motor, means for supplying direct current excitation to the field winding, means for controlling the direction of said direct current excitation, an auxiliary device connected to the motor for producing an alternating current of frequency equal to the slip frequency of the motor while it is running below synchronous speed, and means responsive to the instantaneous direction of said alternating current for effecting operation of said controlling means so that the direct current excitation is reversed in time with the slip frequency of the motor whereby it is always in the proper direction to assist the motor to pull into synchronism.

6. In combination with a synchronous motor having a polyphase stator winding adapted to be connected to an alternating current supply line, and a direct current field winding, means for starting the motor as an induction motor, means for supplying direct current excitation to the field winding, means for controlling the direction of said direct current excitation, means external to the motor and driven thereby for producing an alternating current of frequency equal to the slip frequency of the motor while it is running below synchronous speed, and means responsive to the instantaneous direction of said alternating current for effecting operation of said controlling means to periodically reverse the direct current excitation of the motor at a rate equal to the slip frequency.

7. In combination with a synchronous motor having a polyphase stator winding adapted to be connected to an alternating current supply line, and a direct current field winding, means for starting the motor as an induction motor, means for supplying direct current excitation to the field winding, means for controlling the direction of said direct current excitation, means energized from the alternating current supply for producing an alternating current of frequency equal to the slip frequency of the motor while it is running below synchronous speed, said means being external to the motor and mechanically connected thereto, and means responsive to the instantaneous direction of said alternating current for effecting operation of said controlling means to periodically reverse the direct current excitation of the motor at a rate equal to the slip frequency.

8. In combination with a synchronous motor having a polyphase stator winding adapted to be connected to an alternating current supply line, and a direct current field winding, means for starting the motor as an induction motor, means for supplying direct current excitation to the field winding, an auxiliary device connected to the motor for producing an alternating current of frequency equal to the slip frequency of the motor while it is running below synchronous speed during the starting period, and means responsive to the instantaneous direction of said alternating current for controlling the direct current field excitation so that it is always in the proper direction to assist the motor to pull into synchronism.

9. In combination with a synchronous motor having a polyphase stator winding adapted to be connected to an alternating current supply line, and a direct current field winding, means for starting the motor as an induction motor, means for supplying direct current excitation to the field winding, an auxiliary device connected to the motor for producing an alternating current of frequency equal to the slip frequency of the motor while it is running below synchronous speed during the starting period, and means responsive to the instantaneous direction of said alternating current for controlling the direct current field excitation so that it is periodically reversed in time with the slip frequency of the motor, whereby it is always in the proper direction to assist the motor to pull into synchronism.

10. In combination with a synchronous motor having a polyphase primary winding connected to an alternating-current supply line and a direct-current field winding, said motor being adapted to start as an induction motor, means for supplying direct-current excitation to the field winding, a converter device connected to the alternating-current supply and driven by the motor, said converter device being adapted to supply a voltage of frequency equal to the slip frequency of the motor when it is running below synchronous speed during the starting period, and means connected to said converter device and responsive to the instantaneous direction of its voltage for controlling the direction of said direct-current field excitation, whereby the field excitation of the motor is reversed periodically in time with the slip frequency during the starting period.

11. In combination with a synchronous motor having a polyphase primary winding connected to an alternating-current supply line and a direct-current field winding, said motor being adapted to start as an induction motor, means for supplying direct-current excitation to the field winding, a converter device connected to the alternating-current supply and driven by the motor, said converter device being adapted to supply a voltage of frequency equal to the slip frequency of the motor when it is running below synchronous speed during the starting period, means for controlling the direction of said direct-current field excitation, and means connected to said converter device and responsive to the instantaneous direction of its voltage for effecting operation of said controlling means, whereby the field excitation of the motor is reversed periodically in time with the slip frequency during the starting period.

SAMUEL B. GRISCOM.